(12) United States Patent
Ubiñana Felix

(10) Patent No.: US 10,570,631 B2
(45) Date of Patent: Feb. 25, 2020

(54) DIAGONAL REINFORCEMENT FOR SUPPORT STRUCTURES FOR FLOOR FORMWORK AND METHOD FOR MOUNTING SAME

(71) Applicant: SISTEMAS TECNICOS DE ENCOFRADOS, S.A., Barcelona (ES)

(72) Inventor: Jose Luis Ubiñana Felix, Barcelona (ES)

(73) Assignee: SISTEMAS TECNICOS DE ENCOFRADOS, S.A., Barcelona (ES)

( * ) Notice: Subject to any disclaimer, the term of this patent is extended or adjusted under 35 U.S.C. 154(b) by 115 days.

(21) Appl. No.: 15/745,328

(22) PCT Filed: Jul. 13, 2016

(86) PCT No.: PCT/ES2016/070529
§ 371 (c)(1),
(2) Date: Jan. 16, 2018

(87) PCT Pub. No.: WO2017/013289
PCT Pub. Date: Jan. 26, 2017

(65) Prior Publication Data
US 2019/0010718 A1   Jan. 10, 2019

(30) Foreign Application Priority Data

Jul. 17, 2015 (ES) .................................. 201531057

(51) Int. Cl.
*E04G 11/56* (2006.01)
*E04G 5/16* (2006.01)
(Continued)

(52) U.S. Cl.
CPC .............. *E04G 11/56* (2013.01); *E04G 5/007* (2013.01); *E04G 5/16* (2013.01); *E04G 7/22* (2013.01);
(Continued)

(58) Field of Classification Search
CPC ........... E04G 5/16; E04G 11/56; E04G 5/007; E04G 7/34; E04G 7/22; E04G 7/30; F16B 7/0446; F16B 21/12; F16B 17/004
See application file for complete search history.

(56) References Cited

U.S. PATENT DOCUMENTS 1,552,333 A   9/1925  Mosher
3,674,293 A * 7/1972  Parsons ................. F16B 7/0446
                                               403/234
(Continued)

FOREIGN PATENT DOCUMENTS

DE        8504805 U1     7/1988
DE       29904275 U1     6/1999
(Continued)

OTHER PUBLICATIONS

Extended European Search Report for Application No. 16827300.1, dated Feb. 13, 2019, in 7 pages.
(Continued)

*Primary Examiner* — Babajide A Demuren
(74) *Attorney, Agent, or Firm* — Knobbe, Martens, Olson & Bear, LLP

(57) ABSTRACT

Diagonal reinforcement for floor formwork support structures, the support structure comprising height-adjustable props on which diagonal reinforcements are mounted, wherein each of the diagonal reinforcements comprises a projecting pivot close to the upper end thereof, or on the upper end itself, the free end of which pivot is deformed towards one side and can fit progressively into one of the holes in the prop on which the pivot is mounted by means of rotation, it being possible to detach the reinforcement simply by reproducing the insertion movement in reverse.

6 Claims, 8 Drawing Sheets

(51) Int. Cl.
*E04G 7/30* (2006.01)
*E04G 5/00* (2006.01)
*F16B 21/12* (2006.01)
*E04G 7/22* (2006.01)
*E04G 7/34* (2006.01)
*F16B 7/04* (2006.01)
*F16B 17/00* (2006.01)

(52) U.S. Cl.
CPC ............... *E04G 7/30* (2013.01); *E04G 7/34* (2013.01); *F16B 7/0446* (2013.01); *F16B 21/12* (2013.01); *F16B 17/004* (2013.01)

(56) References Cited

U.S. PATENT DOCUMENTS

| | | | |
|---|---|---|---|
| 6,220,392 | B1 | 4/2001 | Schwoerer |
| 8,104,579 | B1 | 1/2012 | Fu |
| 2005/0077108 | A1* | 4/2005 | Simoes ............ E04G 1/06 |
| | | | 182/186.5 |
| 2008/0128205 | A1* | 6/2008 | Berlin ............. E04G 5/16 |
| | | | 182/186.7 |

FOREIGN PATENT DOCUMENTS

| | | | | |
|---|---|---|---|---|
| DE | 102017216889 | A1 * | 3/2019 | ............ E04G 5/16 |
| ES | 260328 | A1 | 12/1960 | |
| FR | 1341262 | A | 10/1963 | |
| FR | 2755166 | A1 | 4/1998 | |
| FR | 2887272 | B1 * | 11/2008 | ............ E04G 5/16 |
| FR | 3028541 | A1 * | 5/2016 | ............ E04G 1/15 |
| GB | 2467584 | A | 8/2010 | |
| WO | WO-2016120665 | A1 * | 8/2016 | ............ E04G 1/14 |
| WO | WO-2019057957 | A1 * | 3/2019 | ............ E04G 5/16 |

OTHER PUBLICATIONS

Spanish Search Report dated Jul. 17, 2015 for Application No. 201531057 in 4 pages.

* cited by examiner

DIAGONAL REINFORCEMENT FOR SUPPORT STRUCTURES FOR FLOOR FORMWORK AND METHOD FOR MOUNTING SAME

CROSS-REFERENCE TO RELATED APPLICATIONS

This application is the U.S. National Phase under 35. U.S.C. § 371 of International Application PCT/ES2016/070529, filed Jul. 13, 2016, which claims priority to Spanish Patent Application No. P201531057, filed Jul. 17, 2015. The disclosures of the above-described applications are hereby incorporated by reference in their entirety.

FIELD OF THE INVENTION

The present invention relates to a diagonal reinforcement for floor formwork support structures that comprises features that are novel and advantageous with respect to that which is currently known.

BACKGROUND OF THE INVENTION

In order to support floor formwork, structures are used that are based primarily on multiple props and posts, which, installed below on the lower floor of the structure, make it possible to adjust the height in order to support formwork structures for the upper floor.

In this type of floor formwork support structures, diagonal reinforcement bars are conventionally used which distribute forces between adjacent props and which provide greater rigidity to the support structure such that, in some cases, especially when the props are coupled to a portion of an upper beam for supporting the panels, the "articulated parallelogram" effect can be prevented, which may result in collapse of the structure.

Among the embodiments known to the inventor, Spanish patent no. 491869 by Friedrich Ruschitzka can be cited, which provides means for stabilising shelves comprising a planar diagonal strut ending in a hook which defines straight edges that act as a stop on a wall of the pillar.

Spanish patent no. 2159948 by PERI GmbH discloses diagonal struts, both ends of which fit into openings in the respective vertical supports by means of hooks, which diagonal struts extend towards the other vertical support, it being possible to secure one of the hooks by rotating the strut from an insertion position into the final diagonal position, it being possible to insert the other end perpendicularly to the vertical support corresponding thereto.

Fixed bracing frames of a general rectangular structure are also known which necessarily have four attachment ends that coincide with extensions of the longer sides and which are attached by means of wedge grips in the columns of a support structure preferably in the shape of a prismatic tower.

One of the problems that arises when installing said diagonal reinforcements is that of an operator located on the lower flower handling the reinforcement in order to reach the relatively high point at which the upper end of the diagonal reinforcement must be coupled to a point near the end of the prop. For this purpose, in traditional arrangements, means must be used in order for the operator to be able to climb to the required height such that he can attach the upper end of the diagonal reinforcement, after which said operator attaches the lower end in a position which is within his reach when standing on the lower floor. The action of the operator climbing to a particular height and placing the means for attaching the upper end of the reinforcement takes time, requires the use of means, such as a ladder or the like, which must be transported by the operator himself to different locations, and also carries a certain amount of risk of the operator falling. Different solutions have been disclosed in this technical field for coupling the upper end of the diagonal reinforcement to the desired point on the corresponding prop, as have bracing frames for attaching said diagonal reinforcement between props. However, the solutions currently known in this technical field are costly and complicated, since said solutions require the implementation of relatively complex components for the associated connection to the diagonal reinforcing element or a special structure for the hole or opening in the prop, or both at the same time.

SUMMARY OF THE INVENTION

The inventor of the present invention intends to disclose a diagonal reinforcement for floor formwork support structures having novel features that entail significant cost savings during production and that greatly simplify the placing operation carried out by the operator located on the lower floor of the structure being constructed, since said operator must simply raise the diagonal reinforcement and carry out a simple operation of rotating the reinforcement about the axis thereof such that the reinforcing element is gripped in the hole in the upper part of the prop to which coupling is desired.

The reinforcement according to the invention can be applied, in particular, to floor formwork support structures which comprise two or more upper crossbeams which in turn receive the formwork panel support beams. Nevertheless, for greater simplicity, the embodiment shall be described and depicted taking into account a structure formed of two props that support an upper crossbeam and that are connected by means of two diagonal reinforcements. Obviously, the structure could consist of a greater number of props and a greater number of reinforcements.

In the floor formwork support structure, which shall be considered an appropriate example for representing and explaining the present invention, two reinforcements are positioned between two props in a diagonal arrangement, the reinforcements being attached to a prop by a point close to the lower end thereof by means of adjustable clamps and being attached by the upper ends thereof by means of the arrangement according to the invention.

Therefore, essentially every diagonal reinforcement will have a tubular structure having a preferably, but not exclusively, circular cross section, and a preferably radial projecting pivot close to or in the immediate vicinity of the upper end thereof, the end of which pivot is curved or bent at an angle and has a cross section and curvature that allow it to fit in one of the usual holes of the prop with controlled radial clearance. Said projecting pivot may consist, for example, of a rod having a circular cross section attached securely, for example by means of welding, to the prop close to the upper end thereof. This arrangement is intended to allow insertion of the curved or inclined end of the pivot into the corresponding hole in the prop by means of simply rotating the reinforcement, which is held by the operator from the lower floor of the construction site such that the rotation of the reinforcement about the axis thereof is converted to the rolling of said reinforcement on the prop in the vicinity of the hole in which it is to be inserted, such that the rotation itself, after brief rolling of the reinforcement on the prop, results in the insertion of the curved or bent end of the pivot into the hole in the prop. Once said manoeuvre has been carried out, the reinforcement will not be able to come out of the hole in the prop and should be attached to the other prop of the structure by means of an adjustable flange, which finalises the positioning of the reinforcement.

It will therefore be understood that, by means of this arrangement, both the production of the reinforcement, which turns out to be very simple and cost-effective, and the installation of the reinforcement on the prop of the floor formwork support structure are easily achieved, which installation can be carried out very rapidly by the operator and without having to use auxiliary means such as ladders or objects of another type.

BRIEF DESCRIPTION OF THE DRAWINGS

To aid understanding, explanatory yet non-limiting drawings are included of a preferred embodiment of the present invention.

DETAILED DESCRIPTION OF THE PREFERRED EMBODIMENTS

Figure 1:
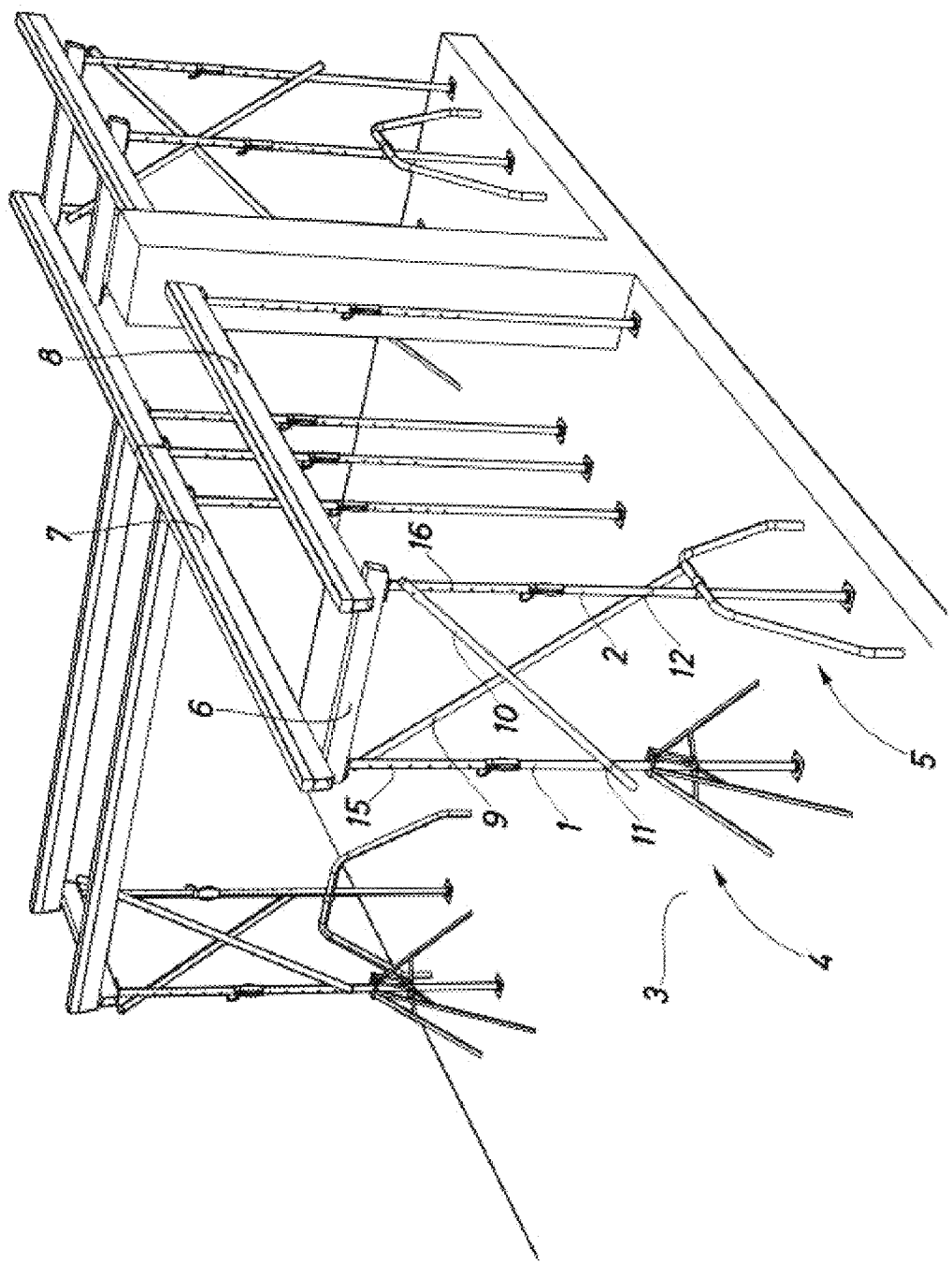
FIG. 1 is a perspective view of a structure intended to support a floor formwork, which structure is supported by props, the arrangement of diagonal reinforcements according to the invention being shown as an example.
Figure 2:
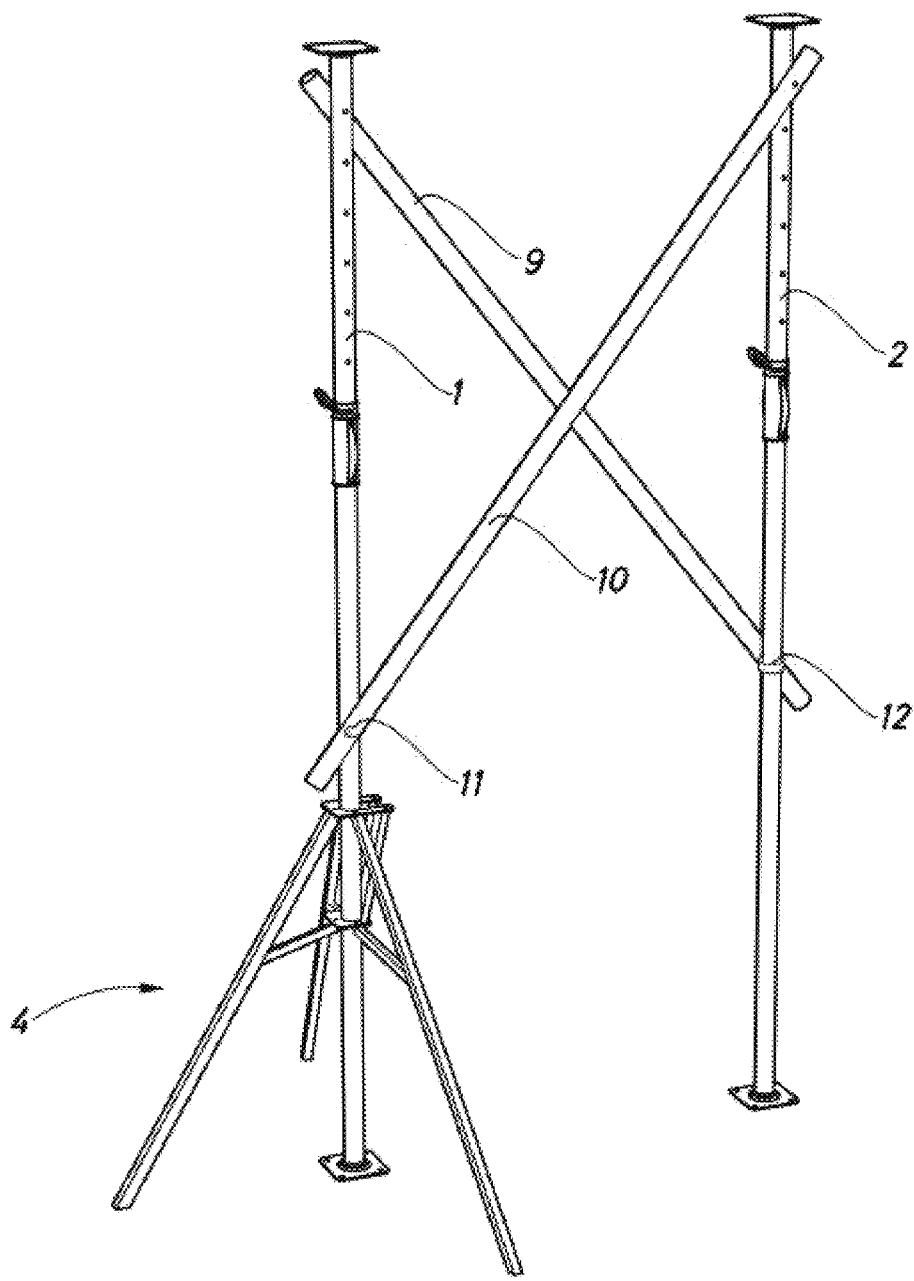
FIG. 2 is a perspective view of a structure element formed of two props and two diagonal reinforcements according to the present invention.
Figure 3:
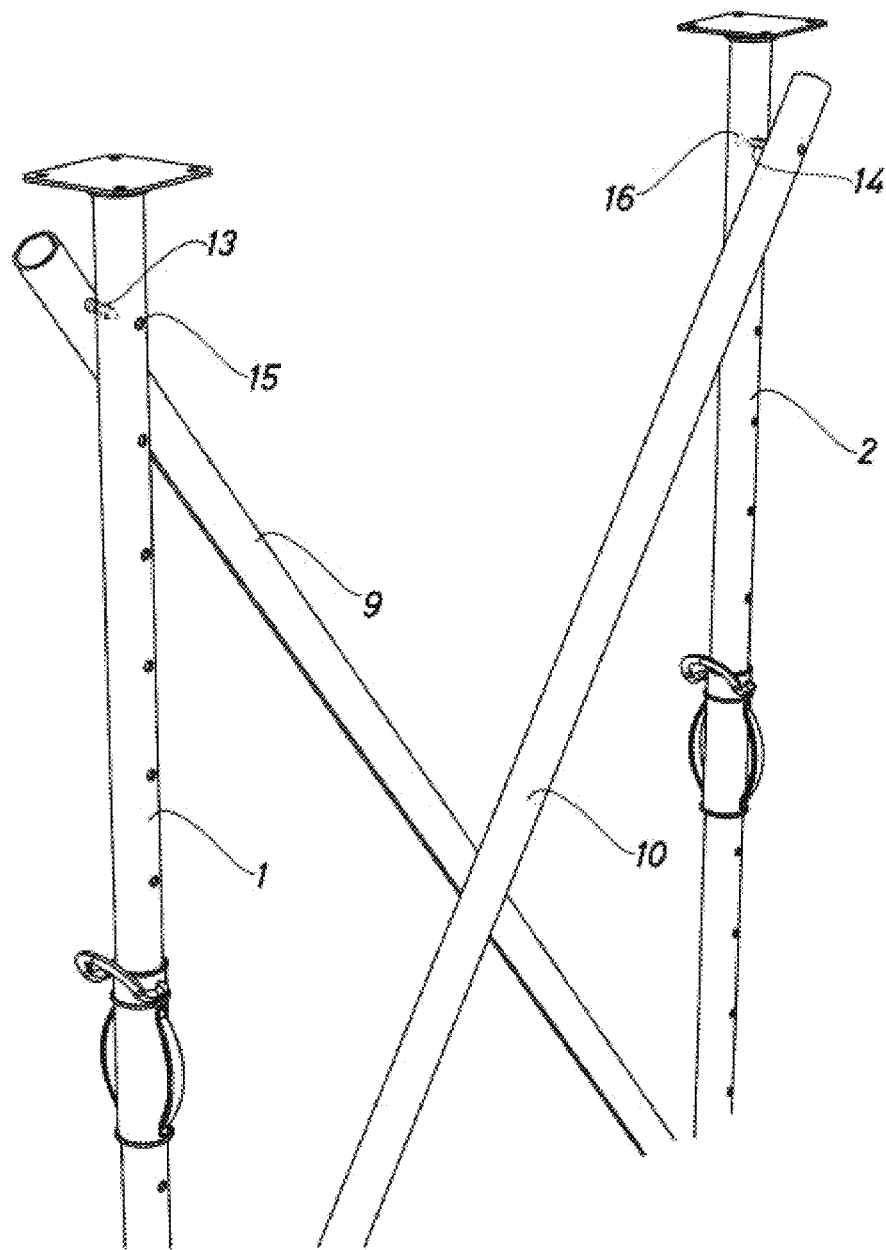
FIG. 3 is a detailed view of the two props and the two diagonal reinforcements from FIG. 2.
Figure 4:
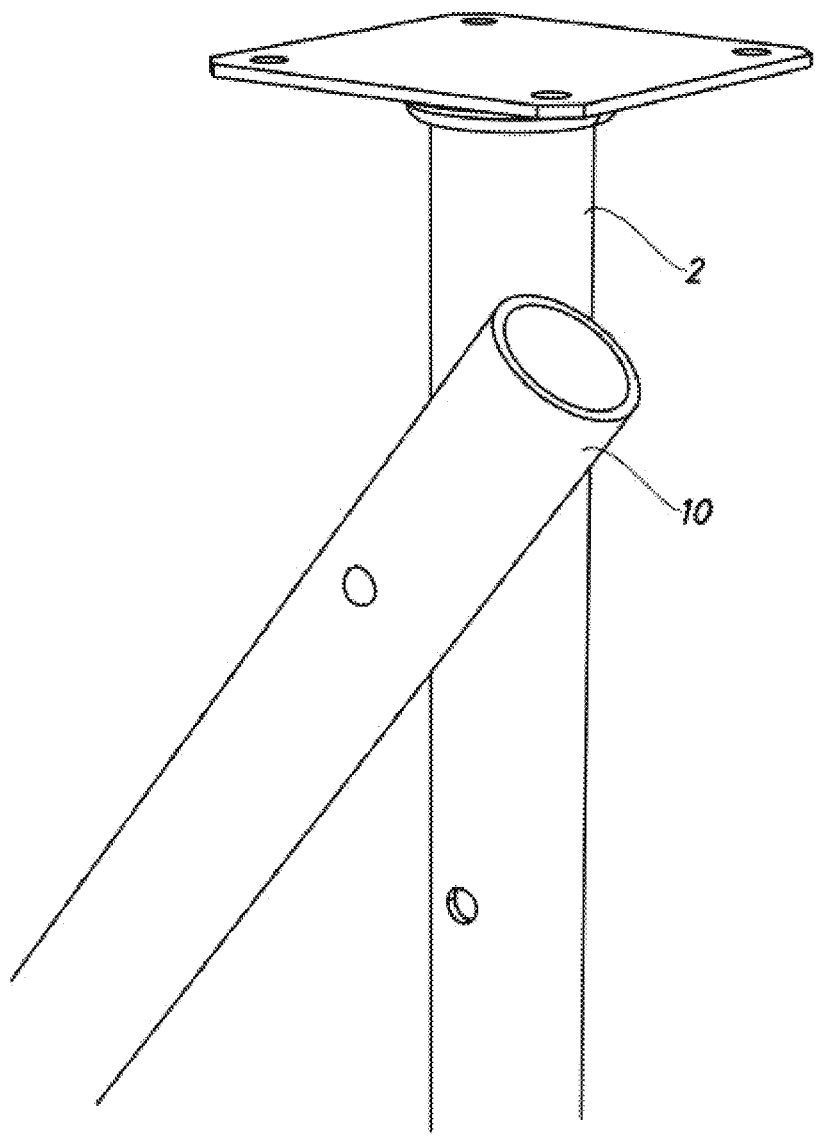
FIG. 4 is a perspective view of a prop with a diagonal reinforcement placed thereon.
Figure 5:
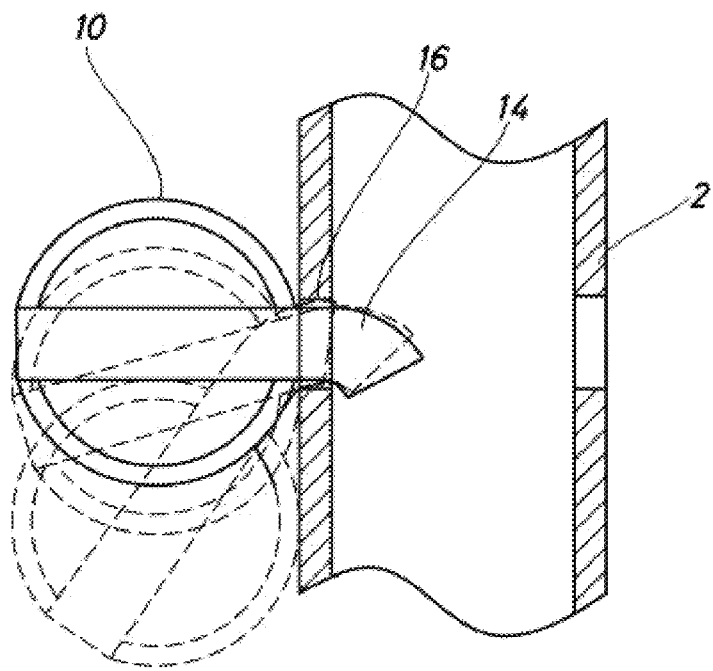
FIGS. 5 to 7 show cross-sectional details of the placement of the projecting pivot of a reinforcement into the corresponding hole in the prop.

As can be seen in FIG. 1, the present invention can be applied to structures for supporting floor formwork that are composed of support props such as those shown by the numbers -1- and -2-, which props rest on the ground -3-, for example, by means of bearing structures -4- and -5- of the variable type and which are coupled at the top, at a variable height by means of rows of holes -15- and -16-, to the floor formwork support structure by means of, for example, a crossbeam -6- on which beams such as -7- and -8- rest, which beams receive the panels that make up the floor formwork. The invention relates in particular to the diagonal reinforcements, such as the reinforcements -9- and -10-, placed between the structure elements shown, i.e. the props -1- and -2-. Said diagonal reinforcements are coupled by the lower portion thereof, i.e. close to the lower end thereof, by means of adjustable flanges -11- and -12- (not shown in detail), whereas on each upper end, said reinforcements comprise a projecting pivot, the free end of which is deformed to a certain extent towards one side by means of a curvature, inclination or other. This is shown firstly in FIG. 3, in which the reinforcements -9- and -10- can be seen to have a pivot close to each upper end thereof, which pivots have a curved free end, which will be explained in detail below, indicated by the numbers -13- and -14- and intended to be inserted into respective holes -15- and -16- in the props -1- and -2-. Once the diagonal reinforcement -10- has been made to rotate slightly about the axis thereof, the edge thereof rolling slightly on the that of the prop -2-, the pivot -14- will have become inserted in the hole -16-, as shown in FIG. 4, the reinforcement being installed on the prop such that it cannot become detached by means of pulling or bending on same, but by carrying out the installation movements in reverse. For this purpose, the pivot -14-, FIGS. 5 to 8, has a short end region that is curved or bent at an angle, as a result of which the pivot cannot come out of the hole -16- in the prop -2- once inserted therein by means of merely pulling or bending. In order to achieve said convenient and simple insertion, the present invention, on account of the specific structure of the means provided thereby, makes possible rolling of the end of the reinforcement -10- on the surface of the prop -2-, as shown schematically in FIG. 5, in which successive positions of the reinforcement -10- are shown by dashed lines in the rolling movement thereof on the surface of the prop -2- until the end -14- of the pivot becomes inserted in the hole -16-. In this way, the operator located on the floor -3-, as shown in FIG. 1, merely has to hold the reinforcement -10- such that it rests on the prop -2- in a position close to the hole -16-, rotating the reinforcement slightly, which translates into rolling thereof in the region in the immediate vicinity of the projecting pivot -14-, such that the pivot -14- is inserted into the hole -16- as a result of said rotation and the corresponding rolling on the prop -2-, as shown in FIGS. 5 and 8. In order to remove the pivot, the rotation and rolling must be carried out in the opposite direction.

Figure 6:
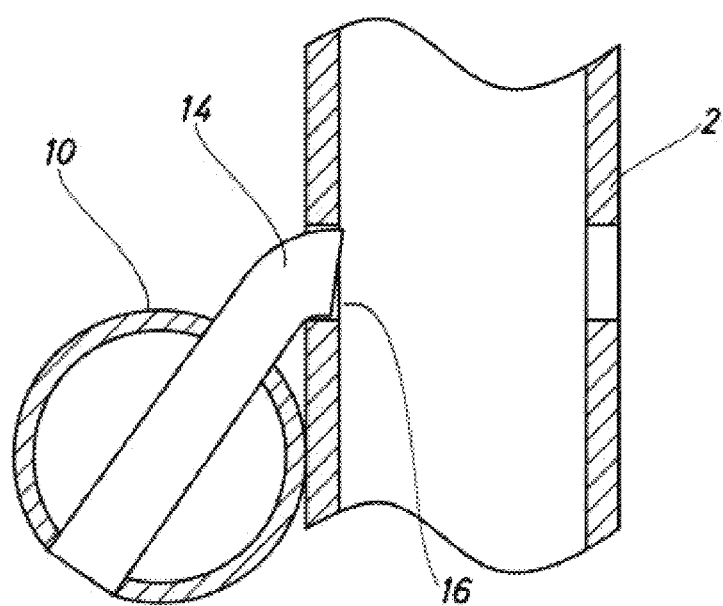
Figure 7:
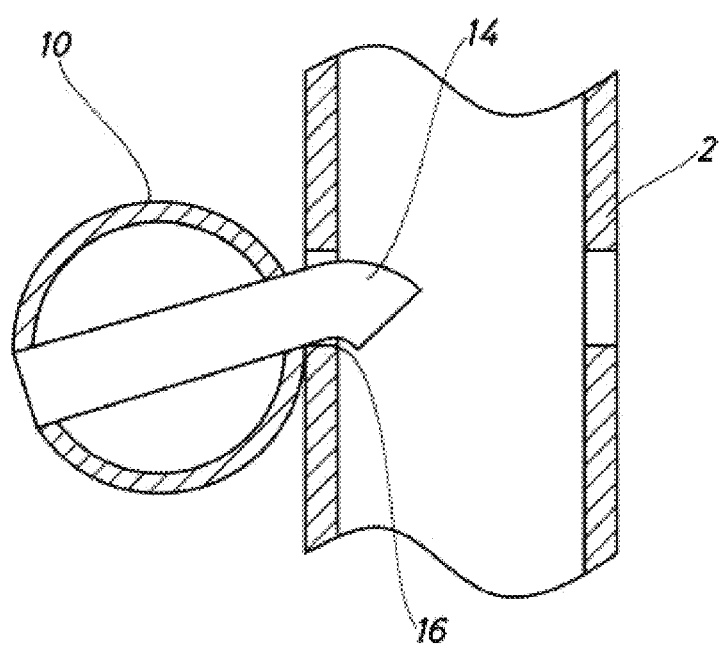
Figure 8:
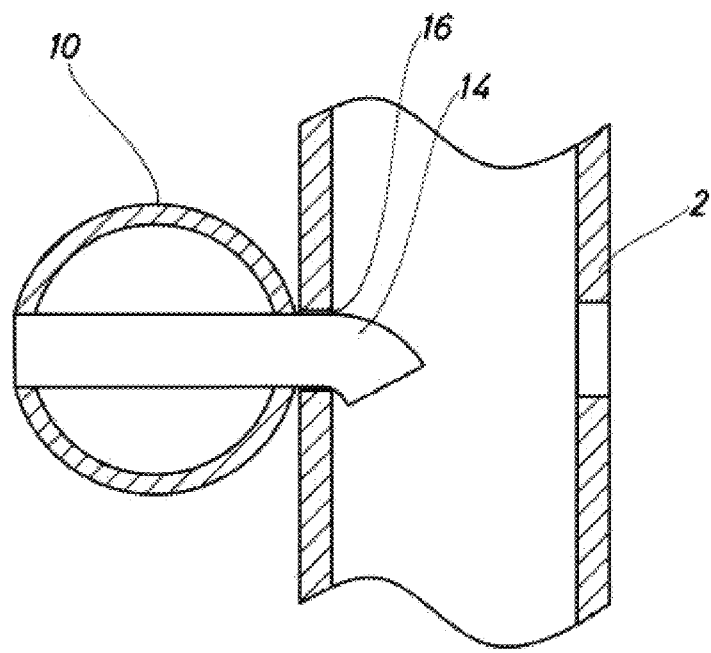
FIG. 8 is a sectional view similar to that of FIGS. 5 to 7 in the position in which the diagonal reinforcement has been completely installed on one end of the corresponding prop.

FIGS. 6 and 7 show intermediate positions of said rotation and placement of the pivot in the corresponding hole thereof, FIG. 6 corresponding to when insertion of the pivot -14- into the hole -16- begins and to a more advanced step shown in FIG. 7. FIG. 8 shows the final insertion position of the pivot -14- in the hole -16-, the diagonal reinforcement -10- being in the final position thereof. The operator then proceeds to attach the adjustable flange -11-, FIG. 1, to the prop -1-, which concludes the task of attaching the diagonal reinforcement to the floor formwork support structure.

Therefore, according to a main aspect, the present invention provides for a diagonal reinforcement for floor formwork support structures, the support structure comprising height-adjustable props on which diagonal reinforcements are mounted, one of the ends of which reinforcements is attached in a hole in the upper portion of a prop and a region close to the other end of said reinforcements is attached to a second prop, the upper portion of the props comprising respective rows of adjustment holes, characterised in that each of the diagonal reinforcements comprises a projecting pivot close to the upper end thereof, or on the upper end itself, the free end of which pivot is deformed towards one side and can fit progressively into one of the holes in the prop on which the pivot is mounted by means of rotation, it being possible to detach the reinforcement simply by reproducing the insertion movement in reverse.

According to another aspect of the invention, the end of the pivot is curved.

In accordance with an additional aspect of the invention, the end of the pivot is bent at an angle.

Likewise, the present invention provides for the end of the pivot to be curved, adopting a curvature that allows the curved end of the pivot to be progressively inserted into the hole in the prop by rotating the reinforcement about the axis thereof, the reinforcement simultaneously rolling on the surface of the prop.

According to another aspect, the invention provides for the pivot to consist of a circular rod that is welded onto the reinforcement.

According to another aspect, the pivot is mounted on the reinforcement, of circular cross section, in a radial arrangement, diametrically crossing the prop and being attached thereto by means of welding.

According to another aspect, the invention provides for a method for installing the reinforcement that comprises the following steps:

a) a first phase in which the operator, located on the floor below the floor to be formed, manually raises the reinforcement until contact is made between a region of the outer surface of the reinforcement and a region of the outer surface of the prop close to the hole in which the reinforcement is to be attached;

b) proceeding to rotate the diagonal reinforcement about the axis thereof, without losing contact with the outer surface of the prop, the reinforcement simultaneously carrying out a rolling movement on the surface of the prop;

c) progressively inserting the end of the pivot of the reinforcement into the hole in the prop at the same time as the reinforcement rolls on the prop; and d) after completely inserting the pivot into the hole in the prop, proceeding to attach the lower end of the diagonal reinforcement to another prop by means of an adjustable clamp.

A functional aspect of the present invention is that the reinforcement can only be detached from the prop by rotating the reinforcement about the axis thereof and rolling the reinforcement on the prop in the opposite direction to the insertion thereof.

Although the invention has been set out and described with reference to an embodiment of the floor formwork support structure, it should be understood that these do not limit the invention, and that it is possible to alter many structural or other details that may prove obvious to persons skilled in the art after interpreting the subject matter disclosed in the present description, claims and drawings. Therefore, the scope of the present invention includes any variant or equivalent that could be considered covered by the broadest scope of the following claims.

What is claimed is:

1. Diagonal reinforcement for floor formwork support structures, the support structure comprising height-adjustable props on which diagonal reinforcements are mounted, one of the ends of which reinforcements is attached in a hole in the upper portion of a prop and a region close to the other end of said reinforcements is attached to a second prop, the upper portion of the props comprising respective rows of adjustment holes, wherein each of the diagonal reinforcements comprises a projecting pivot close to the upper end thereof, or on the upper end itself, wherein a free end of the pivot is curved adopting a curvature that allows the curved end of the pivot to be progressively inserted into one of the holes in the prop on which the pivot is mounted by rotating the reinforcement about an axis thereof, the reinforcement simultaneously rolling on the surface of the prop, and it being possible to detach the reinforcement simply by reproducing the insertion movement in reverse.

2. Reinforcement according to claim 1, wherein the end of the pivot is bent at an angle.

3. Reinforcement according to claim 1, wherein the pivot consists of a circular rod that is welded onto the reinforcement.

4. Reinforcement according to claim 3, wherein the pivot diametrically crosses the prop, of circular cross section, and is attached thereto by means of welding.

5. Method for installing the diagonal reinforcement according to claim 1, comprising:

a) a first phase in which the operator, located on the floor below the floor to be formed, manually raises the reinforcement until contact is made between a region of the outer surface of the reinforcement and a region of the outer surface of the prop close to the hole in which the reinforcement is to be attached;

b) proceeding to rotate the diagonal reinforcement about an axis thereof, without losing contact with the outer surface of the prop, the reinforcement simultaneously carrying out a rolling movement on the surface of the prop;

c) progressively inserting the end of the pivot of the reinforcement into the hole in the prop at the same time as the reinforcement rolls on the prop; and d) after completely inserting the pivot into the hole in the prop, proceeding to attach the lower end of the diagonal reinforcement to another prop by means of an adjustable clamp.

6. Method according to claim 5, wherein the reinforcement can only be detached from the prop by rotating the reinforcement about the axis thereof and rolling the reinforcement on the prop in the opposite direction to the insertion thereof.

* * * * *